United States Patent [19]
Burkhardt et al.

[11] Patent Number: 5,378,868
[45] Date of Patent: Jan. 3, 1995

[54] SHUT OFF CHECK VALVE FOR A WELDING GUN

[76] Inventors: James F. Burkhardt, 31755 Ridgeside Dr., Apartment #3524, Farmington Hills, Mich. 48334; Ronald R. Matheson, 53340 Beechwood, Shelby Township, Oceana County, Mich. 48316; Daniel R. Burnham, 40833 Ruggero, Clinton Township, Jackson County, Mich. 48038; David A. Burnham, 4339 Lehigh, Troy, Mich. 48098

[21] Appl. No.: 30,813

[22] Filed: Mar. 12, 1993

Related U.S. Application Data

[63] Continuation-in-part of Ser. No. 852,787, Mar. 17, 1992, abandoned.

[51] Int. Cl.6 ............................................. B23K 11/31
[52] U.S. Cl. ........................... 219/89; 219/86.31; 219/120
[58] Field of Search ............... 219/89, 119, 120, 86.31; 137/68.1, 75

[56] References Cited

U.S. PATENT DOCUMENTS

| | | | |
|---|---|---|---|
| 2,409,550 | 10/1946 | Dobkowski | 219/120 |
| 2,677,744 | 5/1954 | Fahrenbach | 219/120 |

FOREIGN PATENT DOCUMENTS

| | | | |
|---|---|---|---|
| 2948038 | 6/1981 | Germany | 219/120 |
| 689403 | 8/1951 | United Kingdom | 219/119 |

*Primary Examiner*—Geoffrey S. Evans
*Attorney, Agent, or Firm*—Harness, Dickey & Pierce

[57] ABSTRACT

A shut off check valve for controlling cooling fluid flow to weld tips of a resistance welding gun. The valve is disposed within the weld gun housing and selectively interrupts cooling fluid flow between fluid inlet and outlet ports.

18 Claims, 3 Drawing Sheets

SHUT OFF CHECK VALVE FOR A WELDING GUN

RELATED APPLICATIONS

This is a continuation-in-part application of U.S. patent application Ser. No. 852,787, filed Mar. 17, 1992, now abandoned, and having the same title, the specification and drawings of which are expressly incorporated by reference.

FIELD OF THE INVENTION

The present invention relates generally to welding technology and, more particularly, to a shut-off check valve for controlling the flow of cooling fluid to the weld tips of a resistance welding gun.

BACKGROUND OF THE INVENTION

Resistance welding utilizes the flow of electrical current to permanently join two or more overlapping pieces of metal together. The metallic workpieces are placed in an overlapping position between two electrodes. The electrodes are then forced together until they contact the workpieces therebetween at a pressure sufficient to provide a good electrical contact. An electrical current is induced to flow from one electrode, through the metal to be joined, and into the other electrode. The workpieces act as a conductor in the electrical circuit and resistance to the flow of current at the interface between the metals generates heat. Based on the amount of current which flows and the length of time it is allowed to flow, the metal positioned between the electrodes is transformed into a molten state which flows together and, when cooled, forms a weld "nugget" permanently bonding the pieces together.

During the weld process, however, the electrode tips or caps, usually formed of a highly conductive metal or alloy, also increase in temperature due to the passage of current therethrough as well as heat conduction from the workpieces. Without proper cooling of the tips, this can result in excessive tip wear, deformation of the tips, sticking of the tips to the workpiece or even tip melting, all of which contribute to increased maintenance and poor weld quality. To cool the electrode tips, a system which creates a flow of cooling fluid, usually water, to an interior cavity formed within the weld tip is typically employed.

A resistance welding apparatus, having a conventional weld tip cooling system is shown generally in FIG. 1. The apparatus consists of a weld gun 10 which includes a movable arm 12 and a fixed arm 14, each having an electrode holder 16 to hold an electrode 18 having an electrode tip 20. Typically, pneumatic pressure is applied to movable arm 12 to force that arm toward fixed or floating arm 14 and, hence, to force the electrodes 18 together to contact the workpiece 22 positioned therebetween at a predetermined pressure and for a predetermined time period. During the time in which the electrodes 18 contact workpiece 22, the flow of both electrical current and cooling water to the weld tip 20 is induced. Upon retraction of the movable arm 12 and concurrent removal of the electrode tips 20 from the workpiece 22 (or sometime therebefore) the flow of current and/or water is disrupted.

A water deflector tube 28 is employed within the electrode 18 to direct the flow of water to and from the weld tip area. The cooling water passes from the water inlet port 24 through an interior channel 30 in the water deflector tube 28 to a small hollow cavity 32 formed in the interior of the weld tip 20. The water circulates within the cavity 32 and then is forced out through an outlet channel 34 to the water outlet port 26.

A means for inducing and stopping the flow of water to the electrode tip, conventionally in the form of a system of water supply/return valves and manifolds (not shown), is housed external the gun 10. This water supply/return system is usually connected to inlet and outlet ports 24 and 26 on the gun 10 by hoses 36 and 38. Functions such as shutting off the water flow to the tip if the tip should break off can also be performed with the conventional system, commonly accomplished by sensing a pressure differential between water in the supply and return hoses. This is useful as the tip may be manually removed from the electrode for replacement or repair or may develop a hole or break off due to high heat or other problems.

However, there exist numerous disadvantages to this type of configuration wherein the means for controlling water flow is housed external to the gun. These disadvantages include a high degree of complexity, a large number of parts and relatively high cost.

SUMMARY OF THE INVENTION

The present invention provides a simplified and improved system for controlling the flow of cooling fluid to the weld tip of a resistance welding gun. A fluid inlet port and a fluid outlet port are connected in fluid communication with each other. The cooling fluid circulates from the inlet port through an interior cavity in the electrode tip and then to an outlet port. A shut off check valve for interrupting this flow is disposed within the weld gun, thereby eliminating problems inherent with conventional fluid control means disposed external to the weld gun.

Additional features and advantages of the present invention will become apparent to one skilled in the art upon review of the following description and appended claims taken in conjunction with the accompanying drawings.

DETAILED DESCRIPTION OF A PREFERRED EMBODIMENT

Figure 3:
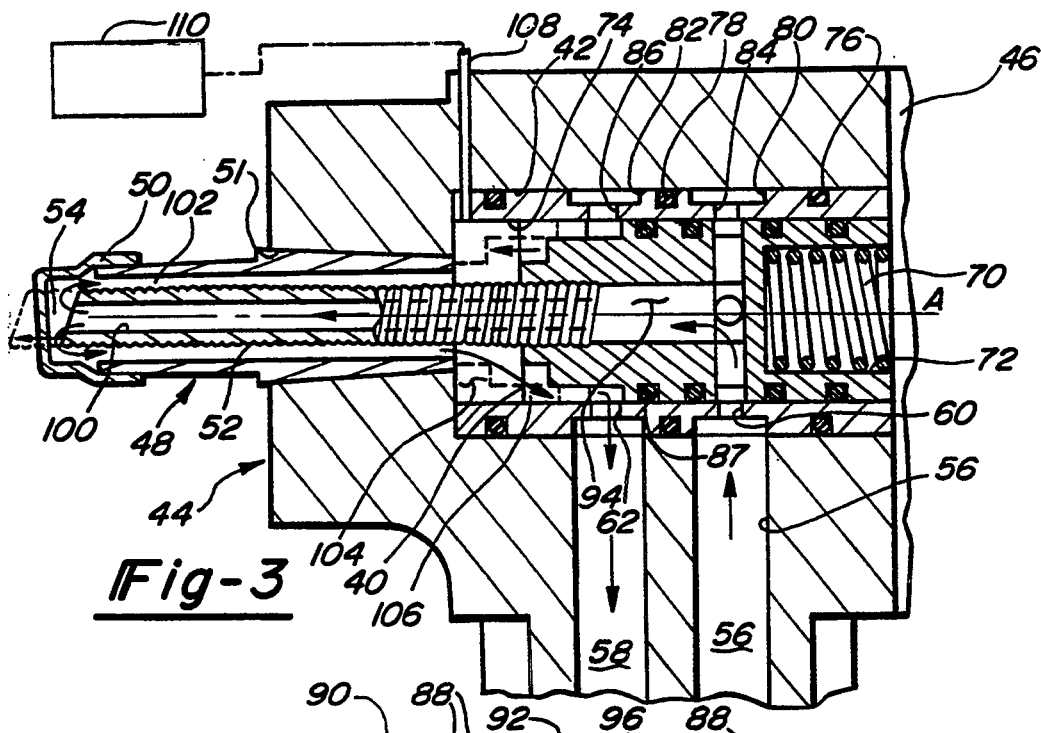
FIG. 3 is a cross-sectional view taken generally through the center of one arm of a welding gun having a shut off check valve according to the teachings of the present invention.

Referring now to FIG. 3, a shut off check valve for a welding gun according to the teachings of the present invention is shown generally at 40. Valve 40 is positioned within an interior preferably circular bore 42 in the gun housing 44 and is retained therein by a cover plate 46. A conventional electrode 48 having a tip 50 is press fit into an opening 51 in the weld gun housing 44. A water deflector tube 52, employed within the electrode 48, is used to control the flow of water to and from the valve 40 and a small hollow cavity 54 formed within the tip 50.

Figure 1:
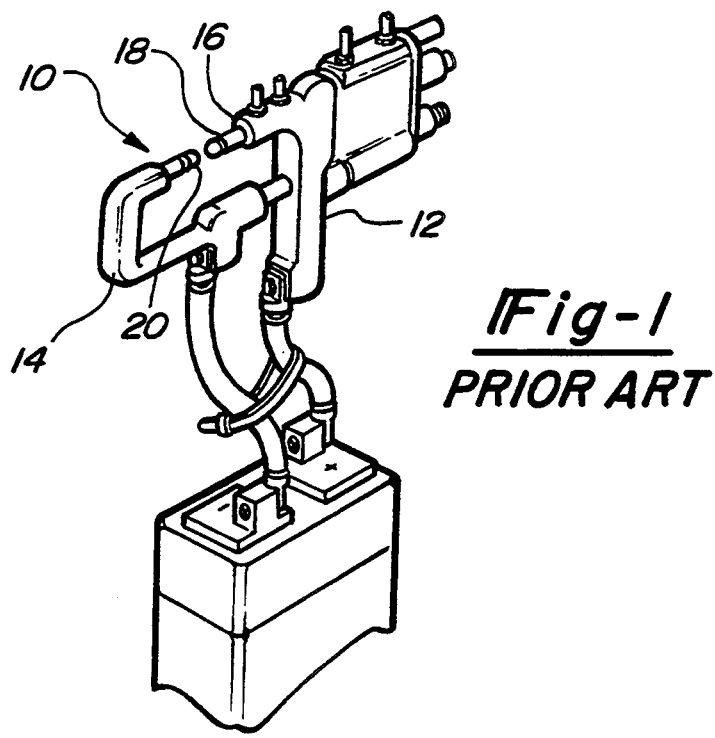
FIGS. 1 and 2 are views of a conventional resistance welding apparatus illustrating the water cooling system thereof.
Figure 2:
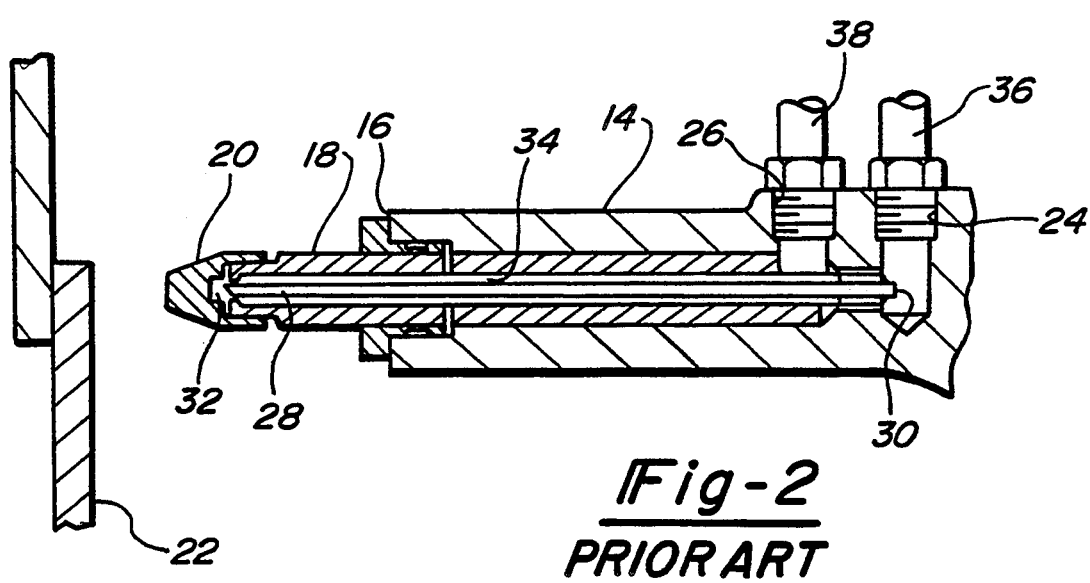

A water inlet port 56 and a water outlet port 58 are also provided in housing 44 and are connected so as to be capable of fluid communication with each other through the check valve 40 and deflector tube 52. Water inlet port 56 has a tapped hole 60 (preferably NPT to prevent leakage) coupled to a water supply hose and water outlet port 58 has a similar tapped hole 62 coupled to a water return hose. The water inlet and outlet ports, 56 and 58, shown in FIG. 3 disposed below valve 40 in a lower portion of the gun, could alternately be disposed in an upper portion if desirable as shown in the conventional weld apparatus of FIGS. 1 and 2.

The shut-off check valve 40 includes two parts, a sleeve 66 and a piston 68 slidably disposed within sleeve 66, along a longitudinal axis A. A bias means, preferably a spring 70, fits within an interior bore 72 formed in piston 68 and biases the piston 68 away from the cover plate 46 and, hence, toward the weld tip 50.

Figure 4:
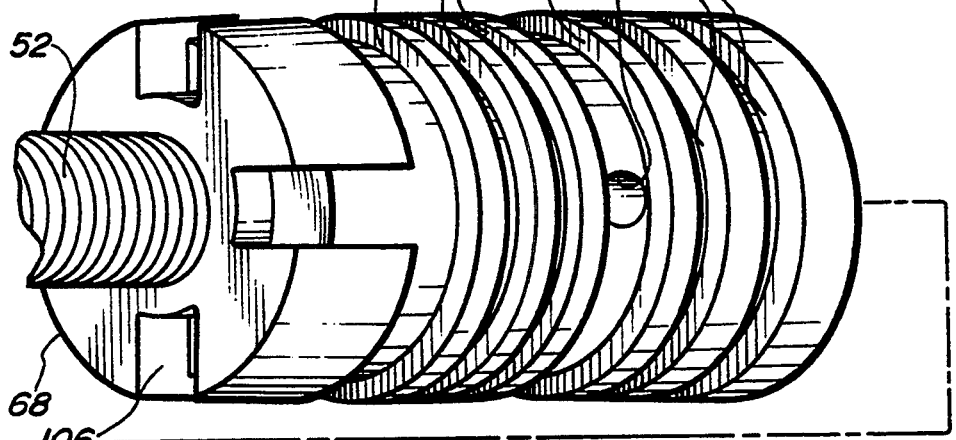
FIG. 4 is a detailed side view of the outer sleeve and piston of the shut off check valve.
Figure 4:
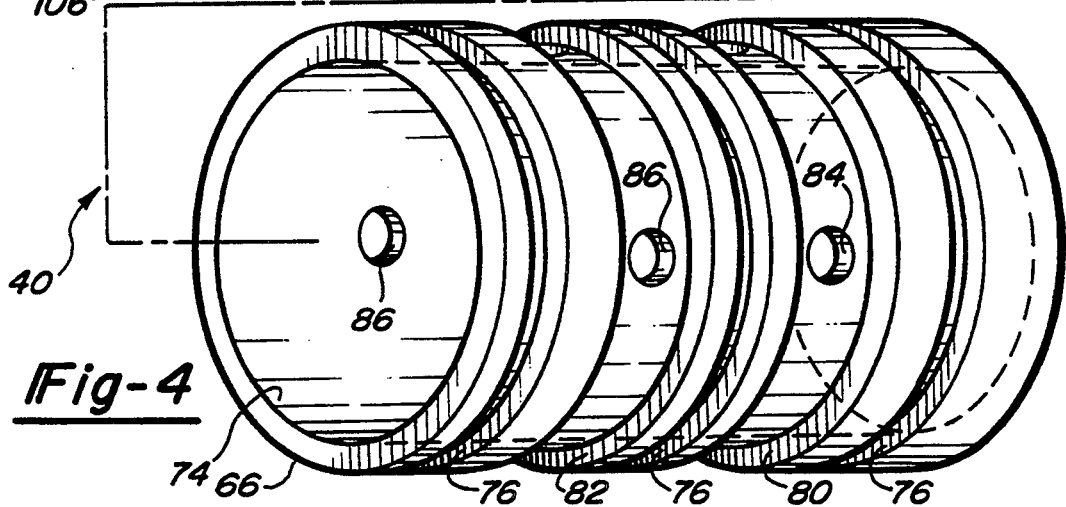

As best shown in FIGS. 3 and 4, the sleeve 66 is substantially circular in cross section, having an interior, preferably round channel 74 formed therethrough along longitudinal axis A. Sleeve 66 also has three annular channels 76 formed therein, preferably disposed in a spaced relationship toward each end and the center of sleeve 66 along axis A. An O-ring 78 is preferably placed within each annular channel 76 to sealingly engage sleeve 66 within bore 42 in the gun housing 44.

Sleeve 66 also includes a pair of annular recesses 80 and 82, each being disposed along sleeve 66 intermediate annular channels 76. These annular recesses 80 and 82 each have four holes, 84 and 86 respectively, bored through to interior channel 74. Each of holes 84 are preferably disposed radially 90° apart as are holes 86. Sleeve 66 is disposed in bore 42 such that one of holes 84 in annular section 80 is aligned with and in fluid communication with water inlet port 56 and one hole 86 in recess 82 is aligned with and in fluid communication with water outlet port 58.

Piston 68, best shown in FIGS. 3 and 4, is also substantially circular in cross section and is of an outside diameter substantially equal to the inside diameter of the channel 74 of sleeve 66, enabling a closely toleranced fit. Piston 68 has four annular recesses 88 having disposed in each, between piston 68 and sleeve 66, an O-ring 87. Piston 68 also includes two circumferential recesses 90 and 92 as well as an interior passage 94 along axis A which extends partially through piston 68 but not through to bore 72. At least one hole 96 is bored in recessed section 92 through to interior passage 94.

Referring now to FIG. 3, the electrode 48 is press fit into the gun housing 44. The tube 52 is screwed into the piston bore 94. The tube 52 is preferably of a length such that it extends from the electrode 48 prior to securement of the cap as seen in phantom in FIG. 3. Upon placing the cap 50 on the electrode, the tube 52, with its angled bias end, along with piston 68 are slidably moved within the sleeve 66 until the circumferential piston recess 92 aligns with holes 84 in the sleeve annular recess 80 and, therefore, with the water inlet port 56 as seen in FIG. 3. This necessarily forces spring 70 into a normally compressed position. In this position, piston circumferential recess 90 is also aligned with holes 86 in the sleeve annular recess 82 and, therefore, is aligned and in fluid communication with outlet port 58.

A center channel 100 of the water deflector tube 52 is disposed within electrode 48 and extends beyond the electrode 48 within passage 94 into alignment and fluid communication with piston bore. The return channel 102 of water deflector tube 52 surrounds inner channel 100.

When valve 40 is in its normally open position and spring 70 is compressed, as shown in FIG. 3, water flows to the tip 50. Circumferential recess 92 in piston 68 is aligned with sleeve hole 84 to permit flow from the water inlet port 56 around recess 92 and through hole 96 into the center channel 100 of the water deflector tube 52. The water flows through channel 100 and is circulated around the interior cavity 54 of the weld tip 50. The water is then forced out by additional incoming water through return channel 102. Water in channel 102 then flows into the cavity 104 within the sleeve. The water then passes through passageways 108 in piston 68 where it is guided through to circumferential recess 90 and passes through the water outlet port 58 via holes 86 in sleeve 66. Preferably, a closed loop system is created by recirculating the water passing out through outlet port 58 back into inlet port 56.

If the tip 50, electrode 48 and/or retainer sleeve 45 should become dislodged from the gun housing 44, for maintenance reasons or due to excessively high temperature, spring 70 would extend and move the piston 68 and tube 52 to shut off water flow as seen in phantom in FIG. 3. Water is also prevented from flowing out through output port 58 by the fluid communication break between piston circumferential recess 90 and sleeve holes 84 in annular recess 80. This stops the flow of water out through channel 100 as well as within bore 42. The O-rings 76 and 87 in both the open and closed positions substantially prevent any unwanted water flow between piston 68 and sleeve 66 as well as between sleeve 66 and bore 42.

Optionally, sensor 108 may be mounted in the housing 44. The sensor 108 monitors the piston movement so that upon shut off of the water flow, the sensor 108, which is coupled with an alarm system 110, signals the alarm system to sound an alarm to alert a technician that the weld gun is non-functional.

Figure 5:
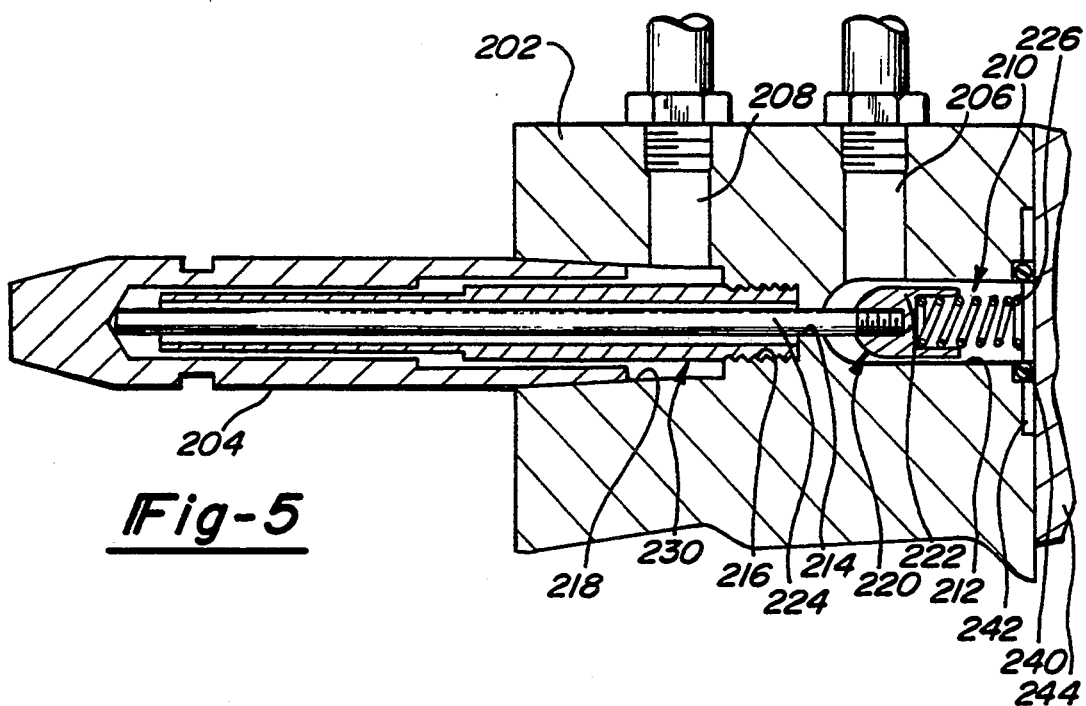
FIG. 5 is a cross-section view taken generally through the center of one arm of a welding gun having a shut off valve according to another embodiment of the present invention.

Turning to FIG. 5, another embodiment of the present invention is shown. FIG. 5 illustrates a welding gun housing 202 with an electrode 204 extending from the housing 202.

The housing 202 includes an inlet fluid port 206 and an outlet fluid port 208. The fluid ports 206 and 208 are associated with a through bore 210. The bore 210 includes a first diameter portion 212, a second diameter portion 214, a third diameter portion 216 and a fourth diameter portion 218. The first diameter portion 212 and third diameter portion 216 have about equal diameters. The second diameter portion 214 has a diameter less than the first and third diameter portions. The fourth diameter portion 218 is larger than the other bore diameter portions. The water inlet 206 is associated with the first diameter bore portion 212 and the water outlet port is associated with the fourth diameter bore portion 218. Also, the electrode 204 is press fit into the fourth diameter bore portion 218.

A valve assembly 220 and fluid directing tube 230 are positioned in the bore 210. The valve assembly 220 includes a piston 222 and an elongated rod 224. The rod 224 and piston 222 are biased by a spring 226. One end of the rod 228 is threaded and screwed into a threaded bore in the piston 222. The other end of the rod 224 abuts the interior of the electrode tip within the electrode's hollow cavity. Thus, when the electrode tip reaches a wear through point, the rod end forces through the tip, and fluid flow exiting the inlet port is terminated via the piston 222.

The fluid directing tube 230 is elongated and includes external threads on one end to thread into the third diameter bore portion 216. The tube 230 extends through the fourth diameter bore portion 216 into the electrode's hollow cavity. Fluid which exits the inlet port 206 is directed, via the second diameter bore portion 214, through the tube 230 to the electrode tip. As the fluid flows through the tube 230, it is directed to the tip where it cools the electrode. The fluid passes along the outside of the tube 230, in the electrode cavity, and exits out through the water outlet 208.

The first diameter bore portion 212 as well as the piston 222 generally include lapped surfaces which correspond to one another such that a close fit exists which substantially eliminates the need for a seal member on the piston. Also, an O-ring seal 240 as well as a gasket 242 are positioned at the other end of the bore 210 on the housing. A cap 244 is positioned on the end of the housing 212 to maintain the valve assembly 220 within the bore 210.

Thus, while the electrode is in a welding condition, fluid flows from the inlet port 206 into the first diameter bore portion 212, through the second diameter portion 214 into the directing tube 230. The fluid is directed toward the electrode tip where it cools the tip. The fluid is then moved along the outside of the tube in the electrode cavity into the outlet port 208. Once the tip wears through, and an aperture begins to appear in the tip or the electrode, the rod 224 pushes outward. The outward movement is due to the spring 226 biasing the piston 222 to move the piston against the lapped surface of the bore 212 to terminate fluid flow through the housing. Thus, the valve closing eliminates the undesirable, uncontrolled fluid flow exiting the bore, which was present in the prior art.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

We claim:

1. A shut off check valve for a welding gun housing comprising:
   (a) a piston adapted for positioning within a bore having an inlet and an outlet port in the welding gun housing, said piston including an elongated portion, said elongated portion including an end abutting a welding tip;
   (b) biasing means moving said piston in said bore upon removal of force on said piston elongated portion end, and said end of said piston projecting through said welding tip; and
   (c) fluid directing means for directing incoming and outgoing fluid flow between the bore inlet and outlet in the welding gun housing.

2. The shut off valve according to claim 1 wherein said piston elongated portion being a rod coupled with said piston.

3. The shut off valve according to claim 1 wherein said piston has a lapped hemispherical head adapted for abutting a corresponding portion of said bore.

4. The shut off valve according to claim 1 wherein said directing means includes an elongated tube adapted for coupling with said bore and extending into an electrode cavity and said elongated portion extending through said elongated tube.

5. A resistance welding gun comprising:
   (a) a housing having an inlet port and an outlet port, both ports coupled with a bore;
   (b) an electrode with a tip, said electrode having a cavity formed therein;
   (c) said electrode adapted to be coupled with said housing bore;
   (d) valve means for interrupting the flow of a cooling fluid between said inlet port and said outlet port, said valve means being disposed in said housing bore, said valve means including a slidable member having a portion adapted for contacting the electrode, and upon wear through of said tip, said portion of said slidable member projects through said tip; and
   (e) fluid directing means for directing incoming and outgoing fluid flow between the bore inlet and outlet in the welding gun housing.

6. The welding gun according to claim 5 wherein said bore includes a first portion for receiving said valve slidable member, a second portion for receiving said fluid directing means, and a third portion for receiving the electrode.

7. The welding gun according to claim 6 wherein said inlet port is coupled with said first portion and said outlet port is coupled with said third portion.

8. The welding gun according to claim 5 wherein a biasing member is coupled with said slidable member for moving said member.

9. The welding gun according to claim 6 wherein said first bore portion and said slidable member having corresponding lapped surfaces.

10. A shut off check valve for a welding gun housing comprising:
    (a) a sleeve means adapted for positioning within a bore in the welding gun housing, a fluid inlet port associated with said sleeve means adapted for enabling fluid flow into said sleeve means;
    (b) a fluid outlet port in said sleeve means, said outlet port in fluid communication with said fluid inlet port and adapted to enable fluid flow out of said sleeve means; and
    (c) means for interrupting the flow of a fluid between said inlet and outlet ports in said sleeve means, said means for interrupting includes a piston and a biasing means, said biasing means moving said piston for terminating fluid communication between said outlet port and said inlet port, said piston includes a pair of separated bores, one of said bores enabling fluid flow and the other bore housing said biasing means so that said biasing means is out of contact with the cooling fluid.

11. The valve of claim 10 wherein said piston is slidably disposed within said sleeve means.

12. The valve of claim 11 wherein fluid communication between said sleeve means and said piston includes corresponding openings defined in each of said sleeve means and piston, said biasing means interrupting fluid communication through said openings.

13. A resistance welding gun comprising:
    (a) a housing;
    (b) an electrode having an electrode tip, said tip having a hollow cavity formed therein and said electrode adapted to be press fit into a first bore in said housing;

(c) a fluid outlet port and a fluid inlet port, said inlet port being in fluid communication with said outlet port, said inlet port being disposed in a second bore formed in said housing and said outlet port being disposed in a third bore formed in said housing; and (d) valve means for interrupting the flow of a cooling fluid between said inlet and outlet ports, said valve means being disposed in a bore in said housing, said valve means includes a piston slidably disposed within a sleeve, said piston including an internal bore for enabling passage of the cooling fluid and said piston having at least one external passageway for enabling return of the cooling fluid.

14. The welding gun of claim 13 wherein said valve means includes a bias means for biasing a member such that said outlet port is out of fluid communication with said inlet port.

15. The welding gun of claim 14 wherein said bias means is a spring.

16. The welding gun of claim 15 wherein said fluid inlet port is in fluid communication with said fluid outlet port through a means for fluid communication between said sleeve and said piston.

17. The welding gun of claim 16 wherein said slidable movement of said piston within said sleeve interrupts flow of fluid between said inlet and outlet ports.

18. The welding gun of claim 17 wherein said means for fluid communication between said sleeve and said piston includes corresponding openings defined in each of said sleeve and piston, said spring biasing said piston in said sleeve to interrupt fluid communication through said openings.

* * * * *